United States Patent

[11] 3,566,009

| [72] | Inventors | Andrew J. Lamond<br>Philadelphia, Pa.;<br>Gene Arthur Tyrer, Tecumseh; Charles<br>George Neuroth, Blissfield, Mich. |
|---|---|---|
| [21] | Appl. No. | 765,069 |
| [22] | Filed | Oct. 4, 1968 |
| [45] | Patented | Feb. 23, 1971 |
| [73] | Assignee | Stauffer-Wacker Silicone Corporation |

[54] FIRE-RESISTANT ELECTRICAL CABLES
6 Claims, 2 Drawing Figs.

[52] U.S. Cl. .................................................. 174/116,
174/102, 174/110, 174/121
[51] Int. Cl. ............................................... H01b 7/28
[50] Field of Search ........................................ 174/105,
102, 113, 116, 121, 121.3, 121.4, 110.7;
161/(Inquired)

[56] References Cited
UNITED STATES PATENTS

| 2,442,613 | 1/1948 | Nicodemus | 174/110(.7)UX |
| 2,800,524 | 7/1957 | Van Lear | 174/116 |
| 3,030,215 | 4/1962 | Veatch | 161/(Micro Ball) |
| 3,230,121 | 1/1966 | Nitzsche | 174/110(.7)X |
| 3,303,270 | 2/1967 | Shelton | 174/121 |

*Primary Examiner*—E. A. Goldberg
*Attorney*—Marion D. Ford

ABSTRACT: The disclosure relates to multiple conductor electrical cables containing room-temperature-curable organopolysiloxanes as valley sealants. The organopolysiloxane may be filled with low density cellular particulate matter having closed or semiclosed cells, such as glass spheres, which will revert to a nonconductive inert organic silica layer when exposed to open flame. The silica layer protects the electrical integrity of the wire even in the advent of a long duration open flame condition.

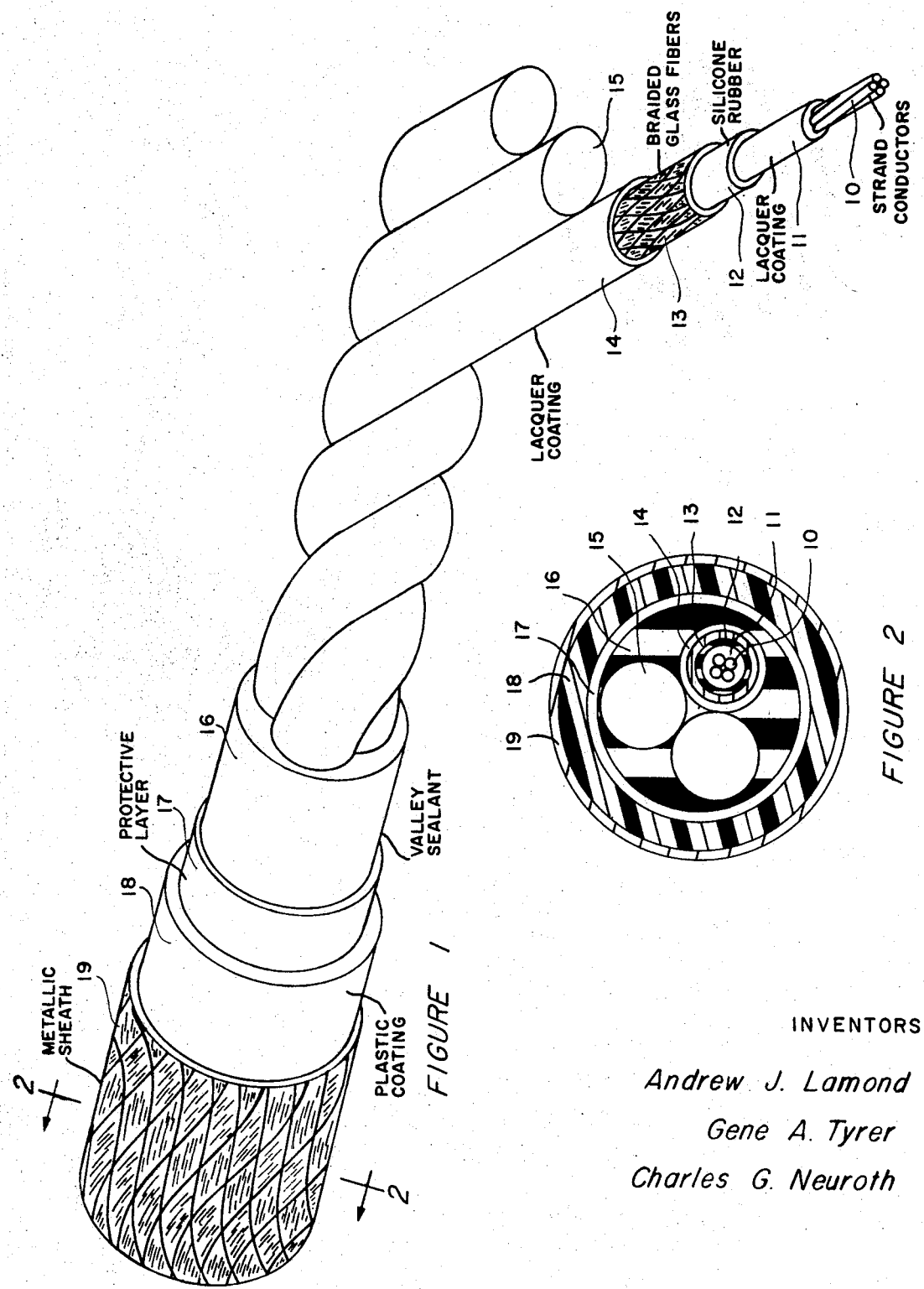

FIRE-RESISTANT ELECTRICAL CABLES

This invention relates to electrical cables, particularly to insulated electrical cables and more particularly to insulated electrical cables which contain filled or unfilled room-temperature-curable organopolysiloxanes as valley sealants.

Heretofore, various organic polymers and adhesive-type materials were used as valley sealants in electrical cables containing a multiplicity of conductors to prevent moisture wicking at the sire ends. Even though these valley sealants prevented moisture wicking, they were extremely difficult to remove when the cables were spliced. In addition, exposure of the cables to an open flame frequently resulted in consumption of the valley sealants and destruction of the circuit integrity. Although several types of valley sealants have been used by the industry, many of these sealants will not maintain circuit integrity when exposed to an open flame environment.

Therefore, it is an object of this invention to provide a new and improved electrical cable containing multiple conductors. Another object of this invention is to provide electrical cables which are free of moisture wicking. Still another object of this invention is to provide electrical cables which will maintain circuit integrity when subjected to an open flame. A further object of this invention is to provide electrical cables which may be easily stripped for splicing.

The foregoing objects and advantages which will become apparent from the following description are accomplished in accordance with this invention, generally speaking, by providing multiple electrical conductor cables which contain room-temperature-curable organopolysiloxanes as valley sealants. In addition, the curable organopolysiloxanes may be filled with low density cellular particulate matter having closed or semiclosed cells, such as hollow glass spheres, which will revert to a nonconductive, inert inorganic silica layer when exposed to open flame. The silica layer protects the circuit integrity of the cable even in the advent of a long duration open flame environment.

This invention will be better understood by the following description and reference to the accompanying drawing wherein:

FIG. 1 is a front-elevational view of an electrical cable of this invention with successive layers cut away to show the structures;

FIG. 2 is a cross-sectional view of the electrical cable of this invention.

Referring to FIGS. 1 and 2, the electrical cable includes a strand or multiple strand conductor 10, preferably of a nickel clad copper stranded material; although it is to be understood that copper, silver and other metallic conductors may also be utilized singly or in combination with other materials. A coating 11 of varnish or lacquer is applied to strand conductor 10 as a sealant and directly over the coating is applied a silicone rubber layer 12. In the preferred embodiment, methylsilicone rubber is used; although it is to be understood that other silicone rubbers, such as methyl, vinyl, phenylsilicone rubber and fluorosilicone rubber, as well as other types of silicone rubber may also be utilized. The silicone rubber may be extruded or applied as a tape or film, or as part of a silicone rubber glass tape or polyester fiber silicone rubber tape or film. In the preferred embodiment, an extruded silicone rubber layer is used because of its ease of fabrication.

In the preferred embodiment, the silicone rubber layer 12 is covered with braided or woven glass fibers 13 which are fabricated in accordance with conventional braiding methods from a plurality of filamentary strands or ribbonlike members. Each of the filamentary strands or members is extremely thin and is characterized by a high degree of flexibility which is particularly advantageous in coiled cables. Moreover, the individual filamentary strands forming the braid and crossing each other repeatedly do not develop or sustain any inductive effect as would be the case with conventional metallic coatings. Other braided or woven materials which may be used are cotton, rayon, and other synthetic fibers or combinations thereof.

Generally, a lacquer layer 14, preferably a nylon lacquer, is applied to the braided glass fibers 13 in order to seal and prevent unraveling of the braided fibers. The coated strand conductors 15 thus formed are hereinafter referred to as "single" conductors.

In fabricating the electrical cable, two or more "single" conductors 15 are wound in a spiral fashion about each other to provide a compact electrical cable containing a multiplicity of conductors. A room-temperature-curable silicone rubber is applied as a valley sealant 16 to the twisted "single" conductors 15 to form a layer of insulation around and between the adjacent "single" conductors.

A protective layer 17 formed from a flexible material is applied over the silicone rubber valley sealant 16 to provide the physical and electrical protection generally required to meet environmental conditions. The layer 17 must be sufficiently thin to preclude substantial diameter buildup in the electrical cable and must be sufficiently strong to withstand the tensile strength imparted thereto during normal use. Materials which satisfy these requirements and which can be satisfactorily utilized as a protective layer are polyethylene terphthalate, polytetrafluoroethylene, polyfluorotrifluoroethylene, polyesters, cellophane, cellulose acetate and the like. While some of these materials are commercially available under the trade names Mylar, Teflon, and Kel-f, Mylar is the preferred base material since it has a high tensile strength and is relatively inexpensive.

If desired, a flexible protective layer 18 may be extruded over layer 17 to provide additional protection where extreme environmental conditions are encountered. Generally, an extruded elastomeric or plastic-type material is employed which will impart flame resistance and also provide a unitary continuous coating to the cable. This will prevent moisture wicking through overlapping layers of coating 17 into the interior of the cable. Where coating 18 is made from an elastomeric material, its flame resistance may be substantially improved by the addition of suitable flame resistant materials. Examples of suitable elastomeric materials are polyvinylchloride, urethane, neoprene, nitrile rubber compounds, and silicone rubber.

The electrical cable is covered on its outer surface with a braided metallic sheath 19 to protect it against abrasion. The braided metallic cover may be formed from approximately 12 to 16 strands or strips of metal and braided over the protective coating 18. The metal sheath protects the cable against abrasion, provides it with increased strength, and helps to maintain the integrity of the cable even when exposed to a flame. Examples of suitable metals used in making the sheath 19 are nickel, aluminum, lead, brass, and alloys thereof.

The silicone rubber used as valley sealant 16 is a fluid room-temperature-curable hydroxyl-terminated organopolysiloxane which may contain a low density cellular particulate matter which minimizes conductive and convective heat transfer and reduces the weight of the total composition and optionally may include an antiflaming material which makes the composition self-extinguishing when heated to a very high temperature.

The curable organopolysiloxane composition employed in accordance with this invention includes a curing agent and a catalyst. The organopolysiloxane may be represented by the formula:

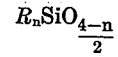

$$R_n SiO_{\frac{4-n}{2}}$$

where R represents monovalent hydrocarbon radicals and halogenated monovalent hydrocarbon radicals and $n$ has an average value of from 1.95 to 2.1.

Specific examples of R groups which are operative in this invention are alkyl groups, such as methyl, ethyl, and octadecyl; cycloaliphatic groups, such as cyclohexyl and cyclopentyl; aromatic hydrocarbon radicals, such as phenyl, xenyl, and naphthyl; aralkyl groups, such as benzyl; alkaryl groups, such as tolyl and xylyl; unsaturated hydrocarbon radicals, such as vinyl, allyl, and cyclohexenyl; and halogenated monovalent hydrocarbon radicals, such as chloromethyl, bromophenyl, tetrafluoroethyl, trifluorovinyl, trifluorotolyl, hexafluoroxylyl, heptachloroxenyl, heptafluoropropyl, chlorodifluorovinyl, chlorohexafluorocyclopentenyl, and the like.

It is to be understood that the siloxanes employed herein can be either homopolymeric materials or copolymeric materials containing two or more different siloxane units and further that both organic radicals attached to any one silicon atom can be the same or different.

The polymeric siloxanes can range in viscosity from 100 centipoises at 25° C. up. The viscosity of the polymer will depend upon the end use of the elastomer.

Any of the various curing systems known in the silicone field may be employed in connection with the present invention. Thus, the organopolysiloxanes may be cured with organic silicates which include both orthosilicates of the formula $Si(OR')_4$ in which R' is an aliphatic hydrocarbon radical of less than 8 and preferably less than 6 carbon atoms and partial hydrolyzates of such orthosilicates commonly known as polysilicates. These polysilicates of polymeric materials have silicon atoms linked through $Si\text{-}O\text{-}Si$ linkages with the remaining valences of the silicon atom being satisfied by OR' radicals.

Suitable examples of organic silicates are n-propylorthosilicate, amylorthosilicate, allylorthosilicate, pentanylorthosilicate, diethyldipropylethylsilicate, ethylpolysilicate, methylpolysilicate, isopropylpolysilicate, n-butylpolysilicate, and mixtures thereof.

Examples of low density closed or semiclosed cellular particles are hollow glass spheres, expended cellular perlite or expanded mica fused clay spheres, $SiO_2$ spheres, and the like.

Generally, the amount of low density cellular particles employed in the composition may range from about 1 to about 50 percent, more preferably from about 10 to 40 percent by weight based on the weight of the composition.

Small amounts of the order of about 2 percent by weight of flame retardant material, such as antimony oxide and chlorinated hydrocarbons, can be added to the basic formulation without materially effecting the properties of the curable organopolysiloxane.

If desired, other fillers may be incorporated into the organopolysiloxane compositions of this invention. Suitable fillers include inorganic materials, such as calcium carbonate, titanium dioxide, carbon black, silica powders, iron oxide, asbestos, and the like. The amount of these fillers may range from 10 to 200 parts or more by weight based on the weight of the organopolysiloxane.

The organopolysiloxane compositions are compounded in the usual manner for compounding siloxane elastomers. Generally, the organopolysiloxane, low density cellular particulate matter, silicate and fillers, if desired, are compounded and the curing catalyst added just prior to use.

Curing of the organopolysiloxane compositions takes place spontaneously at room temperature upon mixing the organopolysiloxane, silicate and curing catalyst. Examples of suitable curing catalysts are metal salts of carboxylic acids, such as lead octoate, zinc naphthenate, stannous octoate, dibutyltin diacetate, dibutyltin dilaurate, and the like. Other catalysts which may be used are dibutyltin butoxychloride and quaternary ammonium salts, such as benzyltrimethylammoniumoctoate.

The silicone rubber valley sealant of this invention minimized moisture wicking and also enables the conductor insulation to be readily stripped off for splicing the electrical cables. It also provides extremely high insulation resistance when exposed to an open flame environment and will revert to a nonconductive, inert inorganic silica layer. The silica layer will protect the circuit integrity even in the advent of a long-duration open flame condition.

It should be understood that the foregoing description embodied in the present application is merely illustrative of the application of the invention. Various modifications in the structural features of the described electrical cable incorporating a filled or unfilled curable organopolysiloxane composition could be devised by those skilled in the art without departing from the invention.

We claim:

1. An electrical cable which will maintain its circuit integrity comprising a multiplicity of individual metallic conductors having a room-temperature-cured silicone rubber valley sealant surrounding and intermediate to said metallic conductors, said silicone rubber sealant obtained from the reaction of a hydroxyl terminated organopolysiloxane, an organic silicate and a curing catalyst and containing up to 2 percent by weight of a flame retardant, and a protective covering on said silicone rubber valley sealant.

2. The article of claim 1 wherein the silicone rubber valley sealant contains from 1 to 50 percent by weight of low density cellular particulate matter.

3. The article of claim 2 wherein the particulate matter is hollow glass spheres.

4. An electrical cable which will maintain its circuit integrity comprising a multiplicity of conductors, each containing a metallic strand, a sealant on said metallic strand, a silicone rubber layer on said strand sealant, a fibrous glass braid on said silicone rubber layer, a lacquer layer on said fibrous glass braid, a room-temperature-cured silicone rubber valley sealant surrounding and intermediate to the multiple conductors, said silicone rubber sealant obtained from the reaction of a hydroxyl-terminated organopolysiloxane, an organic silicate and a curing catalyst and containing up to 2 percent by weight of a flame retardant, a protective layer selected from the class consisting of polytetrafluoroethylene, glass fiber, polyvinylfluoride, polyethylene terphthalate, surrounding said valley sealant, and a metallic sheath covering said protective layer.

5. The article of claim 1 wherein the silicone rubber comprises a room-temperature-curable hydroxyl-terminated organopolysiloxane of the formula:

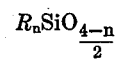

where R is selected from the class consisting of monovalent hydrocarbon radicals and halogenated hydrocarbon radicals and $n$ has an average value of 1.95 to 2.1, an organic silicate and a curing catalyst.

6. The article of claim 5 wherein R is a methyl radical.